(12) United States Patent
Hazeyama

(10) Patent No.: US 10,794,691 B2
(45) Date of Patent: Oct. 6, 2020

(54) APPEARANCE INSPECTION DEVICE, APPEARANCE INSPECTION METHOD AND PROGRAM

(71) Applicant: OMRON Corporation, Kyoto (JP)

(72) Inventor: Hiroyuki Hazeyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/248,808

(22) Filed: Jan. 16, 2019

(65) Prior Publication Data
US 2019/0285406 A1 Sep. 19, 2019

(30) Foreign Application Priority Data

Mar. 13, 2018 (JP) .................................. 2018-045668

(51) Int. Cl.
*G01B 11/25* (2006.01)
*G01N 21/88* (2006.01)
(Continued)

(52) U.S. Cl.
CPC ..... *G01B 11/2522* (2013.01); *G01N 21/8806* (2013.01); *G01N 21/95684* (2013.01);
(Continued)

(58) Field of Classification Search
CPC .......... G01N 2035/00326; G01N 2035/00495; G01N 35/0092; G01N 35/00;
(Continued)

(56) References Cited

U.S. PATENT DOCUMENTS 4,853,771 A * 8/1989 Witriol ................... B25J 9/1697
348/94
2011/0103679 A1 5/2011 Campbell
(Continued)

FOREIGN PATENT DOCUMENTS

CN 102308201 1/2012
CN 103376061 10/2013
(Continued)

OTHER PUBLICATIONS

"Search Report of Europe Counterpart Application", dated Jul. 4, 2019, p. 1-p. 8.
(Continued)

*Primary Examiner* — Michael P Stafira
(74) *Attorney, Agent, or Firm* — JCIPRNET

(57) ABSTRACT

An appearance inspection device that can easily determine optimum values of various imaging parameters is provided. An appearance inspection device includes: a moving means which changes relative positions of at least two or more portions within a work-piece, an imaging part, and an illumination part; an imaging processing part which performs, in a state that the illumination part irradiates a light to the work-piece, a processing for changing imaging parameters and taking a plurality of images by the imaging part under a condition that plural types of imaging parameters with mutually different properties are variably set, the plural types of imaging parameters including a change of the relative position between the work-piece and the imaging part caused by the moving means; and a parameter determining part determining a set of optimum values of the plural types of imaging parameters that are set variably based on the plurality of taken images.

6 Claims, 14 Drawing Sheets

(51) Int. Cl.
  *G01N 21/956* (2006.01)
  *B25J 18/00* (2006.01)
  *G01N 21/95* (2006.01)

(52) U.S. Cl.
  CPC ....... *B25J 18/00* (2013.01); *G01N 2021/8835* (2013.01); *G01N 2021/9518* (2013.01); *G01N 2021/95646* (2013.01)

(58) Field of Classification Search
  CPC ......... G01N 2015/1006; G01N 35/026; G01N 35/10; G01N 35/00871; G01N 35/1065; G01N 21/25; G01N 35/1072; G01N 15/1475; G01N 2035/00138; G01N 2035/00356; G01N 2035/00366; G01N 2035/00425; G01N 2035/0449; G01N 2035/0486; G01N 2035/0491; G01N 2201/024; G01N 2201/04; G01N 33/5005; G01N 33/54366; G01N 35/00029; G01N 35/00069; G01N 35/04; G01N 35/1011; G01N 2015/0073; G01N 2015/008; G01N 2015/1486; G01N 2035/00148; G01N 2035/00237; G01N 2035/00306; G01N 2035/00435; G01N 2035/00633; G01N 2035/0474; G01N 2035/0493; G01N 2035/0494; G01N 21/27; G01N 2201/12; G01N 33/54306; G01N 33/54313; G01N 33/56983; G01N 33/62; G01N 33/6827; G01N 33/80; G01N 33/92; G01N 35/00623; G01N 35/1009; G01N 21/6428; G01N 21/76; G01N 2035/0094; G01N 33/50; G01N 2035/00881; G01N 2035/103; G01N 21/75; G01N 21/78; G01N 15/14; G01N 2021/513; G01N 2021/6417; G01N 2021/6441; G01N 2021/825; G01N 2035/00277; G01N 2035/00811; G01N 21/07; G01N 21/21; G01N 21/35; G01N 21/4133; G01N 21/51; G01N 21/645; G01N 21/65; G01N 33/5302; G01N 35/00732; G01N 35/0098; G01N 1/40; G01N 1/4077; G01N 2001/4083; G01N 2035/1034; G01N 21/13; G01N 21/84; G01N 30/88; G01N 2030/8827; G01N 2035/1048; G01N 21/66; G01N 30/02; G01N 33/48; G01N 33/559; G01N 33/566; G01N 33/86; G01N 35/02; G01N 35/1095; B25J 9/1697; B25J 3/04; B25J 9/1602; B25J 9/1664; B25J 9/1666; B25J 9/1671; B25J 9/1689; G01B 11/303; G02B 2027/0138; G02B 2027/0174; G02B 27/017

See application file for complete search history.

(56) References Cited

U.S. PATENT DOCUMENTS

| | | | |
|---|---|---|---|
| 2011/0298901 A1* | 12/2011 | Derrien | G01N 21/9515 348/50 |
| 2013/0162807 A1 | 6/2013 | Bryll et al. | |
| 2014/0379132 A1* | 12/2014 | Fudaba | B25J 9/1689 700/260 |
| 2015/0321354 A1* | 11/2015 | Nishihara | B25J 9/1697 700/259 |

FOREIGN PATENT DOCUMENTS

| | | |
|---|---|---|
| CN | 104137147 | 11/2014 |
| EP | 0569589 | 11/1993 |
| JP | 2005003476 | 1/2005 |
| JP | 2014126494 | 7/2014 |

OTHER PUBLICATIONS

"Office Action of China Counterpart Application", dated Aug. 5, 2020, with English translation thereof, p. 1-p. 15.

\* cited by examiner

APPEARANCE INSPECTION DEVICE, APPEARANCE INSPECTION METHOD AND PROGRAM

CROSS-REFERENCE TO RELATED APPLICATION

This application claims the priority of Japan patent application serial no. 2018-045668, filed on Mar. 13, 2018. The entirety of the above-mentioned patent application is hereby incorporated by reference herein and made a part of this specification.

BACKGROUND

Technical Field

The disclosure relates to an appearance inspection device, an appearance inspection method, and a program, more specifically to a device, a method, and a program for inspecting an appearance of an object.

Related Art

Conventionally, as for this type of appearance inspection device, for example the following appearance inspection device is known which moves a relative position of a product and an imaging device mounted on a robot arm and the like to image the product by the imaging device and inspects whether the product is unqualified based on the taken images, as disclosed in Japanese Laid-open No. 2014-126494.

[Patent literature 1] Japanese Laid-Open No 2014-126494

Problems to be Solved

Meanwhile, in an appearance inspection using an imaging device mounted on a robot arm and the like, values of various imaging parameters such as a relative position of a product and the imaging device, a focal position of the imaging device, and an illumination intensity of an illumination part are determined from an enormous combination of values of the imaging parameters by a user relying on experience and intuition. Accordingly, it takes time to determine an optimum value of the imaging parameter. Therefore, it is required that the optimum values of various imaging parameters are easily determined at a short time. However, there is a problem in the appearance inspection device described in patent literature 1 (Japanese Laid-Open No 2014-126494), that is, only the optimum value of the imaging parameter of the relative position of the product and the imaging device is determined and the optimum values of various imaging parameters cannot be easily determined from the enormous combination of values of the imaging parameters.

Therefore, a problem provided in the disclosure is to provide an appearance inspection device, an appearance inspection method and a program that can easily determine the optimum values of various imaging parameters in an appearance inspection.

SUMMARY

An appearance inspection device of the disclosure is an inspection device for inspecting an appearance of an object and includes:

an imaging part for taking an image of the object;
an illumination part irradiating a light to the object;
a moving means that changes relative positions of at least two or more portions within the object, the imaging part, and the illumination part;
an imaging processing part that performs, in a state that the illumination part irradiates a light to the object, a processing for changing imaging parameters and taking a plurality of images by the imaging part under a condition that plural types of imaging parameters with mutually different properties are set variably, the plural types of imaging parameters including a change of the relative position between the object and the imaging part caused by the moving means; and
a parameter determining part that determines a set of optimum values of the plural types of imaging parameters that are set variably based on the plurality of taken images.

DESCRIPTION OF THE EMBODIMENTS

Figure 1:
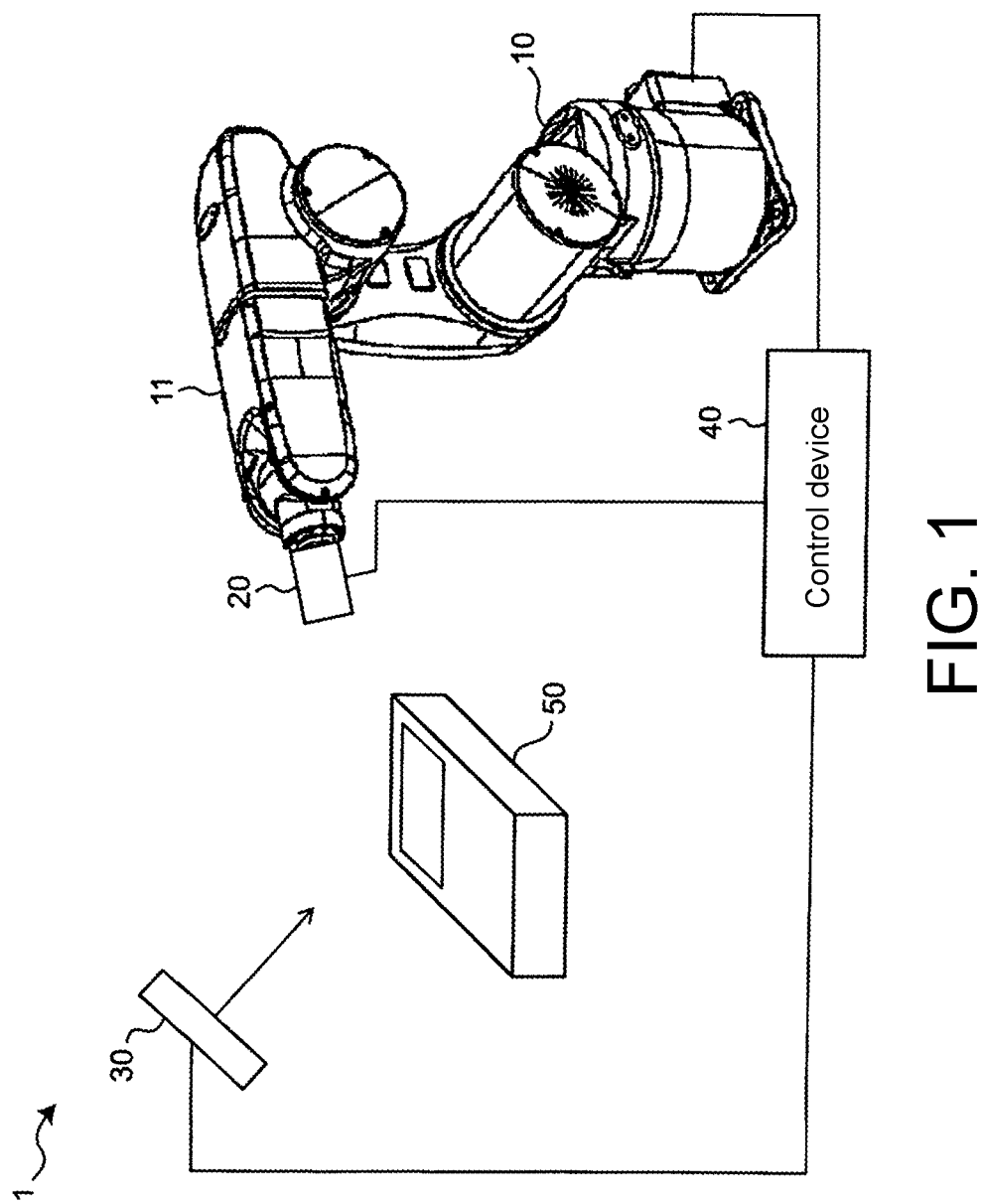
FIG. 1 is an obliquely observed schematic view of an appearance of an appearance inspection device of one embodiment of the disclosure.

An appearance inspection device of the disclosure is an inspection device for inspecting an appearance of an object and includes:
an imaging part for taking an image of the object;
an illumination part irradiating a light to the object;
a moving means that changes relative positions of at least two or more portions within the object, the imaging part, and the illumination part;
an imaging processing part that performs, in a state that the illumination part irradiates a light to the object, a processing for changing imaging parameters and taking a plurality of images by the imaging part under a condition that plural types of imaging parameters with mutually different properties are set variably, the plural types of imaging parameters including a change of the relative position between the object and the imaging part caused by the moving means; and
a parameter determining part that determines a set of optimum values of the plural types of imaging parameters that are set variably based on the plurality of taken images.

In the specification, the "object" refers to, for example, a three-dimensional article which is used as an inspection target, such as a product, a work-piece and so on.

In addition, the "appearance" refers to, for example, a shape, a pattern, and color or the like of the object.

In addition, the "plural types of imaging parameters with mutually different properties" refer to, for example, a workpiece position in the visual field, a focal position of the imaging device, a uniformity of illumination, an intensity of illumination, a distortion in the visual field, a shutter speed, and a light emission pattern and so on. In addition, the plural types of imaging parameters are not limited hereto.

In addition, the "moving means" refers to, for example, a system which includes a one-axis device (which refers to a control axis), a two-axis device, or an industrial robot of three or more axes, and which is capable of causing the object and the imaging part to move and/or rotate relatively.

In addition, the "relative position" refers to information expressed by a total of six parameters of three translation components and three rotation components, and the change thereof means that at least more than one of the six parameters changes.

In the appearance inspection device of the disclosure, the moving means changes relative positions of at least two or more portions of the object, the imaging part, and the illumination part. The illumination part irradiates a light to the object. The imaging processing part performs, in the state that the illumination part irradiates a light to the object, the processing for changing imaging parameters and taking a plurality of images by the imaging part under a condition that plural types of imaging parameters with mutually different properties are set variably, the plural types of imaging parameters including a change of the relative position between the object and the imaging part caused by the moving means. Then, the parameter determining part determines the set of optimum values of the plural types of imaging parameters that are set variably based on the plurality of taken images. Accordingly, in the appearance inspection device, the set of optimum values for the plural types of imaging parameters is determined based on the plurality of taken images from an enormous combination of the imaging parameters. As a result, the optimum values of various imaging parameters can be easily determined.

In the appearance inspection device of one embodiment, the parameter determining part respectively calculates an individual evaluation value representing the quality degree for each of the imaging parameters for the plurality of images, calculates a general evaluation value by a predetermined calculation formula based on the individual evaluation value, and obtains a set of values of the imaging parameters when the general evaluation value is the best within the plurality of images as the set of optimum values.

In the appearance inspection device of this embodiment, various optimal imaging parameters can be easily determined based on the general evaluation value.

In the appearance inspection device of one embodiment, the individual evaluation value is calculated based on a degree to which feature amounts extracted from the plurality of images are consistent with predetermined ideal values or a degree to which the plurality of images are consistent with a pre-registered master image.

In the appearance inspection device of this embodiment, the individual evaluation value is quantitatively calculated. As a result, the imaging parameters can be precisely determined.

In the appearance inspection device of one embodiment, for a predetermined first imaging parameter, the parameter determining part calculates, under a condition that other parameters except the first imaging parameter are fixed, a value of the imaging parameter when the individual evaluation value is the best or a set of values of the imaging parameters when the general evaluation value is the best as a first optimum value or a first set of optimum values; after that, for a second imaging parameter different from the first imaging parameter, the parameter determining part calculates, under a condition that other parameters except the second imaging parameter different from the first imaging parameter are fixed, the value of the imaging parameter when the individual evaluation value is the best or the set of values of the imaging parameters when the general evaluation value is the best as a second optimum value or a second set of optimum values.

In addition, the "first imaging parameter" refers to a subset of one type or plural types of imaging parameters within the plural types of parameters. The "second imaging parameter" refers to a subset of one type or plural types of imaging parameters within a set of the rest parameters except the first imaging parameter within the plural types of parameters.

In the appearance inspection device of this embodiment, the parameter determining part firstly obtains, for the predetermined first imaging parameter, the value of the imaging parameter when the individual evaluation value is the best or the set of values of the imaging parameters when the general evaluation value is the best as the first optimum value or the first set of optimum values. Accordingly, for example, for the imaging parameter (the first imaging parameter) emphasized in advance by a user, a combination number between the imaging parameters is limited, and the first optimum value or the first set of optimum values is rapidly obtained. After that, the parameter determining part obtains, for the second imaging parameter different from the first imaging parameter, the value of the imaging parameter when the individual evaluation value is the best or the set of values of the imaging parameters when the general evaluation value is the best as the second optimum value or the second set of optimum values. In this way, for the rest imaging parameter (the second imaging parameter), a combination number between the imaging parameters is limited, and the second optimum value or the second set of optimum value is rapidly obtained. Accordingly, according to the appearance inspection device of this embodiment, the optimum values of various imaging parameters can be rapidly obtained.

In another aspect, the appearance inspection method of the disclosure is an appearance inspection method for inspecting an appearance of an object by the appearance inspection device and includes:

a step for performing, in a state that the illumination part irradiates a light to the object, a processing for changing imaging parameters and taking a plurality of images by the imaging part under a condition that plural types of imaging parameters with mutually different properties are set variably, the plural types of imaging parameters including a change of the relative position between the object and the imaging part caused by the moving means; and a step for determining a set of optimum values of the plural types of imaging parameters that are set variably based on the plurality of taken images.

In the appearance inspection method of the disclosure, from an enormous combination of imaging parameters, the set of optimum values for the plural types of imaging parameters is determined based on the plurality of taken images. As a result, the optimum values of various imaging parameters can be easily determined.

In another aspect, a program of the disclosure makes a computer execute the appearance inspection method.

As seen from the above, according to the appearance inspection device, the appearance inspection method and the program of the disclosure, the optimum values of various imaging parameters can be easily determined.

In the following, embodiments of the disclosure are specifically described with reference to the drawings.

(Configuration of Appearance Inspection Device)

FIG. 1 is an obliquely observed schematic view of an appearance of an appearance inspection device (denoted by a symbol 1 as a whole) of one embodiment of the appearance inspection device of the disclosure.

As shown in FIG. 1, the appearance inspection device 1 includes a robot 10 which serves as a moving means, an imaging part 20, an illumination part 30, and a control device 40 in general. In the appearance inspection device 1, the control device 40 controls operations of the robot 10, the illumination part 30 and the imaging part 20. The control device 40 controls a posture of the robot 10, the illumination part 30 irradiates a light to an object (appropriately referred to as a "work-piece" hereinafter), and the imaging part 20 images the work-piece 50 so that an appearance inspection is performed.

The robot 10 performs an assembly or movement or the like of the work-piece 50. In this example, the robot 10 is provided with the imaging part 20 on a leading end part of an arm 11 of the robot 10. The robot 10 causes the imaging part 20 to move relatively to the work-piece 50. The relative movement can also include a rotation movement. In this example, the robot 10 is provided with the imaging part 20, but it is not limited hereto, the imaging part 20 may be fixed and installed in a location different from the robot 10. In this case, the robot 10 grips the work-piece 50 on the leading end part of the arm 11, and the robot 10 can cause the work-piece 50 to move relatively to the fixed imaging part 20.

The robot 10 can freely move the position of the leading end part of the arm 11 in a predetermined movable range by interlocking and driving each axis according to a control command given from the control device 40. Besides, in the example, an industrial six-axis articulated robot is used, but the robot 10 is not limited hereto as long as the work-piece 50 and the imaging part 20 can be relatively moved and/or rotated by the robot 10. The moving means may be, for example, a one-axis device, a two-axis device, and a three-axis device.

In this example, the imaging part 20 consists of a camera and images in a state that the illumination part 30 irradiates a light to the work-piece 50. The taken image is output to the control device 40. The imaging part 20 can change a focal position and the like according to a control command including imaging parameters given from the control device 40 and image the work-piece 50.

In this example, the illumination part 30 consists of a lamp serving as a light source and irradiates a light to the work-piece 50. The illumination part 30 can change an intensity, a light emission pattern and the like of the illumination part 30 according to the control command including imaging parameters given from the control device 40. The illumination part 30 is fixed to be movable with respect to the work-piece 50.

Figure 2:
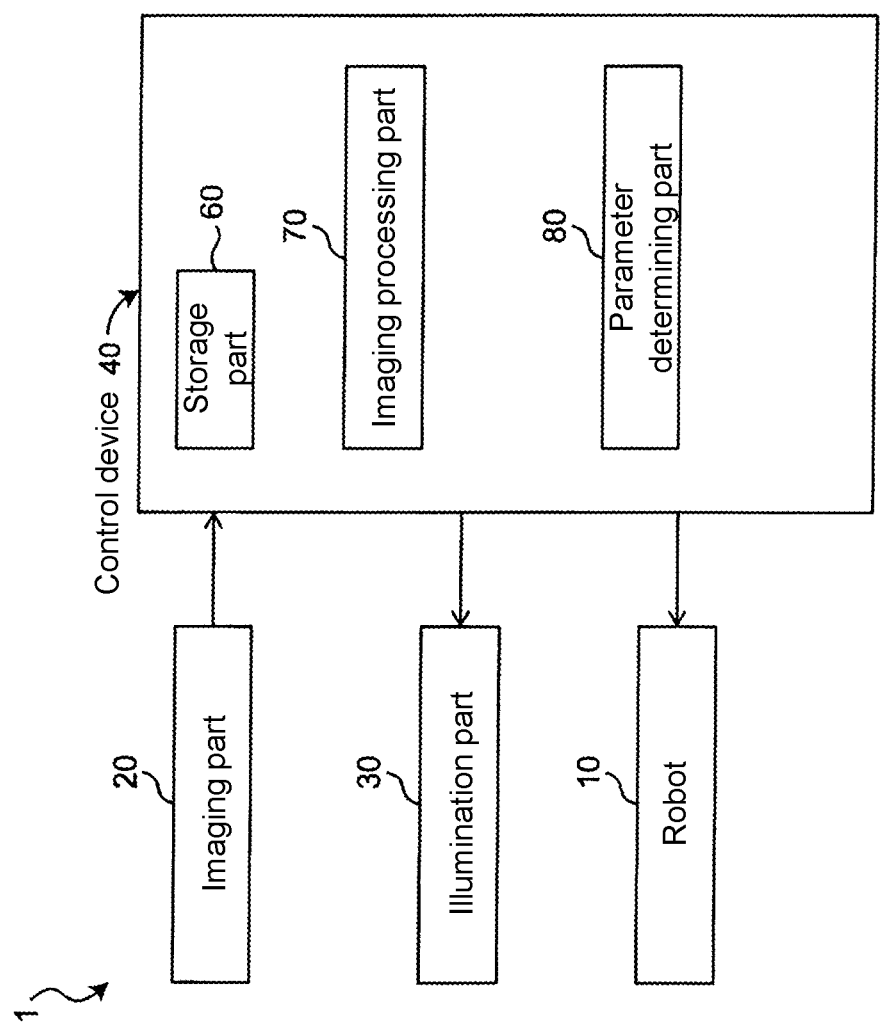
FIG. 2 is a drawing showing a block configuration of a control system of the appearance inspection device.

The control device 40 is provided with a storage part 60, an imaging processing part 70, and a parameter determining part 80, which are shown in FIG. 2 described later. The control device 40 operates to cause the imaging part 20 to take a plurality of images in a state that the illumination part irradiates a light to the work-piece 50. The control device 40 determines a set of optimum values of plural types of imaging parameters based on the plurality of taken images.

The work-piece 50 is a three-dimensional article such as an assembly object which is used as an appearance inspection object. For example, the work-piece 50 may be a product and so on. The work-piece 50 may be placed on a fixed inspection table (not shown) or be placed and move on a conveyor (not shown).

FIG. 2 shows a block configuration implemented by a program for performing the appearance inspection method in the appearance inspection device 1. The control device 40 of the appearance inspection device 1 is provided with the storage part 60, the imaging processing part 70, and the parameter determining part 80.

The storage part 60 consists of a non-volatile semiconductor memory in the example. In the example, the storage part 60 can store not only the images taken by the imaging part 20 but also a master image described later.

The imaging processing part 70 transmits the control command including imaging parameters to the robot 10 and controls the posture of the robot 10. The imaging processing part 70 transmits the control command including imaging parameters to the illumination part 30 and adjusts the intensity of illumination and the uniformity of illumination and so on. The imaging processing part 70 transmits the control command including imaging parameters to the imaging part 20 and adjusts the focal position or the like of the imaging part 20. The imaging processing part 70 performs a processing of taking a plurality of images of the work-piece 50 by the imaging part 20 in a state that a light is irradiated to the work-piece 50. At that time, for each imaging, plural types of imaging parameters with mutually different properties which include a change of the relative position of the imaging part 20 and the robot 10 are variably set. Accordingly, the imaging processing part 70 can capture a plurality of taken images for the work-piece 50 in a state that the plural types of imaging parameters with mutually different properties are set.

The parameter determining part 80 receives the plurality of taken images from the imaging processing part 70, and calculates an individual evaluation value for each of the plurality of taken images based on a degree to which feature amounts extracted from the images are consistent with predetermined ideal values or a degree to which the images are consistent with a pre-registered master image. Specifically, the parameter determining part 80 denotes a number corresponding to a type of the imaging parameter as n, an individual evaluation value representing a quality degree (the better, the larger) for each imaging parameter as An, and a maximum individual evaluation value as An max. Then, the parameter determining part 80 calculates a general evaluation value by a calculation formula Max{(1−An/An max)×100}, and obtains a set of values of the imaging parameters for the image which gives the smallest general evaluation value for the work-piece 50 as a set of optimum values. Here, a sign Max{(1−An/An max)×100} means the maximum value within (1−An/An max)×100. A ratio An/An max normalizes and represents the degree to which the individual evaluation value An is good. Accordingly, (1−An/An max)×100 represents the degree to which the individual evaluation value An is poor in percentage. As a result, when the worst individual evaluation value An is smaller, the general evaluation value is smaller and better.

The above imaging processing part 70 and the parameter determining part 80 are configured by a processor (for example, Central Processing Unit (CPU)) operating in accordance with the program. The control device 40 may include, in addition to the above-described elements, an auxiliary storage device such as a HDD (Hard Disk Drive), a network or a communication interface capable of communicating by wire or radio waves, an input device such as a keyboard or a touch panel, and an output device such as a display. Besides, the control device 40 may be included in the robot 10.

Figure 3:
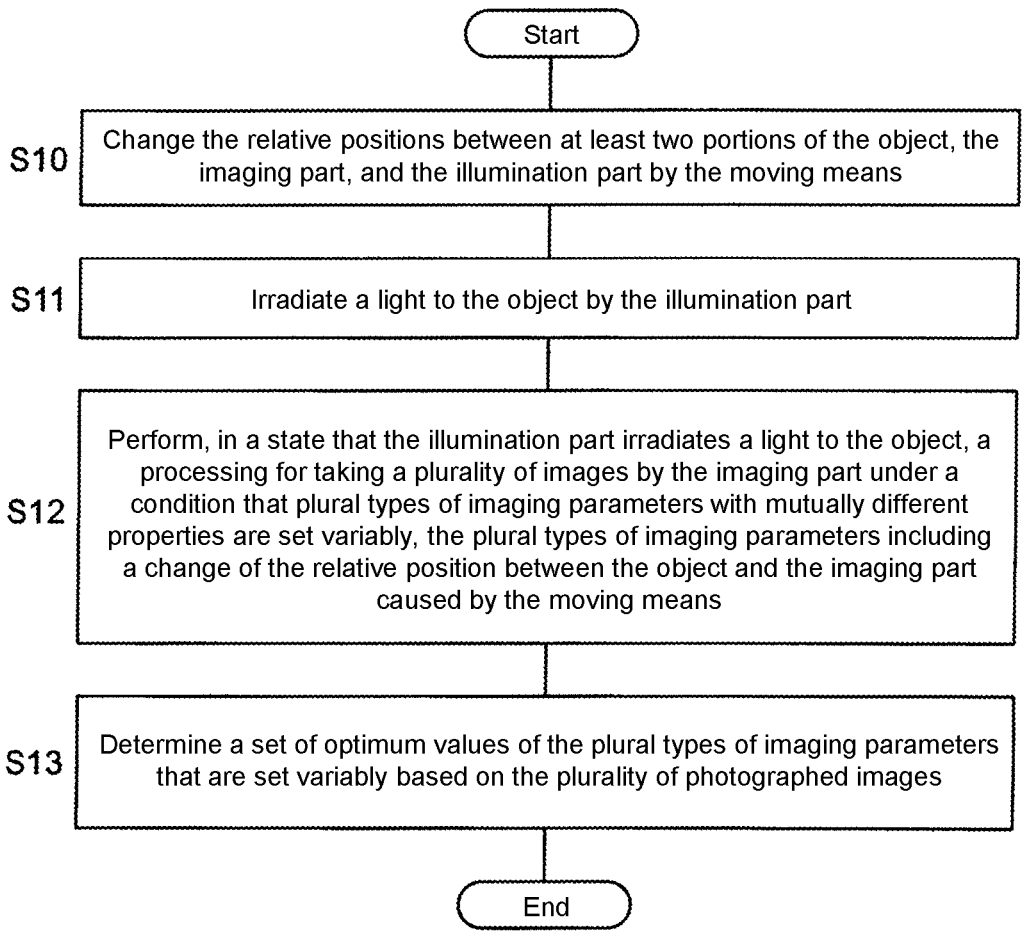
FIG. 3 is an operation flow chart of an appearance inspection method of one embodiment using the appearance inspection device.

FIG. 3 shows an operation flow of the appearance inspection method of one embodiment performed by the appearance inspection device 1. This flow is started, for example, in the way that the appearance inspection device 1 receives a start instruction of operation from a user via the communication interface or the input device or the like of the control device 40.

The imaging processing part 70 changes the relative positions between at least two portions of the work-piece 50, the imaging part 20, and the illumination part 30 by the robot 10 (step S10).

The imaging processing part 70 irradiates a light to the work-piece 50 by the illumination part 30 (step S11).

The imaging processing part 70 performs, in the state that the illumination part 30 irradiates a light to the work-piece 50, a processing for changing imaging parameters and taking a plurality of images by the imaging part 20 under a condition that plural types of imaging parameters with mutually different properties are set variably (step S12). The plural types of imaging parameters with mutually different properties include a change of the relative position between the work-piece 50 and the imaging part 20 caused by the robot 10.

The parameter determining part 80 determines a set of optimum values of the plural types of imaging parameters that are set variably based on the plurality of taken images (step S13).

In this example, from an enormous combination of imaging parameters, a set of optimum values for the plural types of imaging parameters is determined based on the plurality of taken images. As a result, the optimum values of various imaging parameters can be easily determined.

(Individual Evaluation Value an Related to Imaging Parameters)

As for the individual evaluation value An related to the imaging parameters, in the example, the type n of the imaging parameters is 5, and the individual evaluation value An includes a work-piece position in the visual field, a focal position, a uniformity of illumination, an intensity of illumination, and a distortion in the visual field. The individual evaluation value An is obtained as follows.

(1) The individual evaluation value of the work-piece position in the visual field (that is, a distance from the center of the visual field to the work-piece) is obtained by the following formula.
When the work-piece position is (mx, my) and the center of the visual field is (cx, cy), the individual evaluation value is $$\sqrt{(mx-cx)^2+(my-cy)^2} \qquad \text{[Formula 1]}$$

(2) The individual evaluation value of the focal position is obtained by the following formula.
When an average of the concentration values (in this example, the concentration values of monochrome images is shown) of a color C in the pixels on the image is $$\text{avg}(C), \text{ and} \qquad \text{[Formula 2]}$$

Ci represents n pixel values in a specified range, the individual evaluation value is $$\sqrt{\frac{1}{n}\sum_{i=1}^{n}(Ci-avg(Ci))^2}. \qquad \text{[Formula 3]}$$

Besides, in the specification, the example of the concentration value of monochrome images is shown, but the disclosure is not limited hereto. In a case of color images, the concentration value is represented by three values of R (red), G (green), and B (blue).

Figure 12:
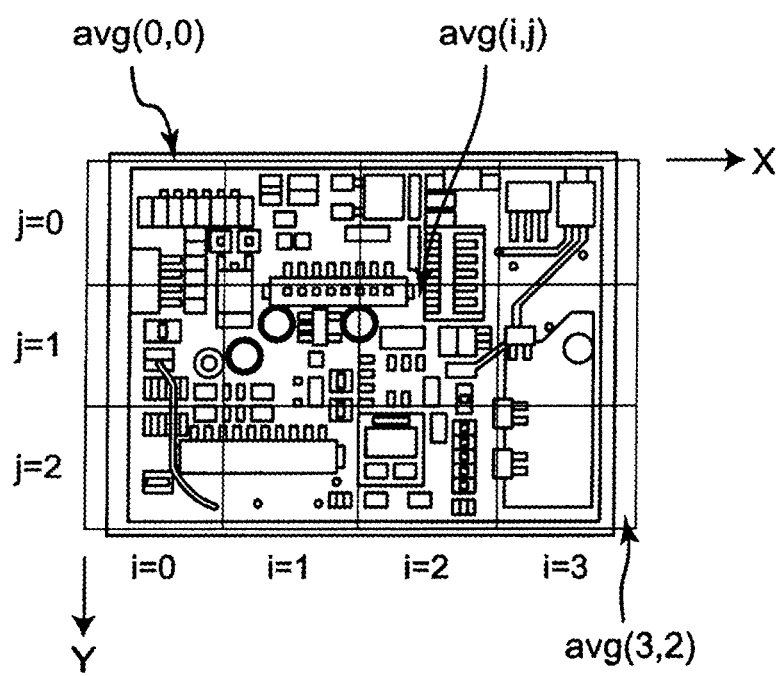
FIG. 12 is a drawing showing the meaning of a pixel average value avg (i,j) in a specified range related to an individual evaluation value of the uniformity of illumination.

(3) The individual evaluation value of the uniformity of illumination is obtained as follows.
As shown in FIG. 12, the parameter determining part 80 divides in a rectangular range of a plurality of rows and a plurality of columns (in the example, three rows and four columns). Then, a number representing an X-direction (column direction) position is set as i (wherein, i=0, 1, 2, 3) and a number representing a Y-direction (row direction) position is set as j (wherein, j=0, 1, 2), and a pixel average value avg(i,j) of each range is obtained. At this time, the individual evaluation value of the uniformity of illumination is obtained by the following formula.

$$\text{MAX}(avg(i,j))-\text{MIN}(avg(i,j))$$

(4) The individual evaluation value of the intensity of illumination is obtained by the following formula.

$$\text{avg}(Ci)$$

(5) As for the individual evaluation value of the distortion in the visual field, when a homogeneous coordinate of a coordinate on a standard image is $$\tilde{m}=(u,v,1)^T, \text{ and} \qquad \text{[Formula 4]}$$

a homogeneous coordinate of a coordinate on a reference image is $$\tilde{m}'=(u',v',1)^T, \qquad \text{[Formula 5]}$$

the individual evaluation value is obtained from an image transformation parameter represented by H.

$$\tilde{m} \square H\tilde{m}' \qquad \text{[Formula 6]}$$

H is as follows.

$$H = \begin{pmatrix} a & b & c \\ d & e & f \\ g & h & i \end{pmatrix} \quad \text{[Formula 7]}$$

Accordingly, the individual evaluation value of the distortion in the visual field is obtained by the following formula.

$$-\text{MAX}(|1-g|,|1-h|)$$

Here, g represents a distortion in the X-direction, and h represents a distortion of the Y-direction. Besides, without being limited to this example, a rotation movement amount can be obtained using a, b, d, e. An amount of enlargement-contraction transformation can be obtained using a, b, d, e, g, h.

(Set Value of An max)

Figure 4:
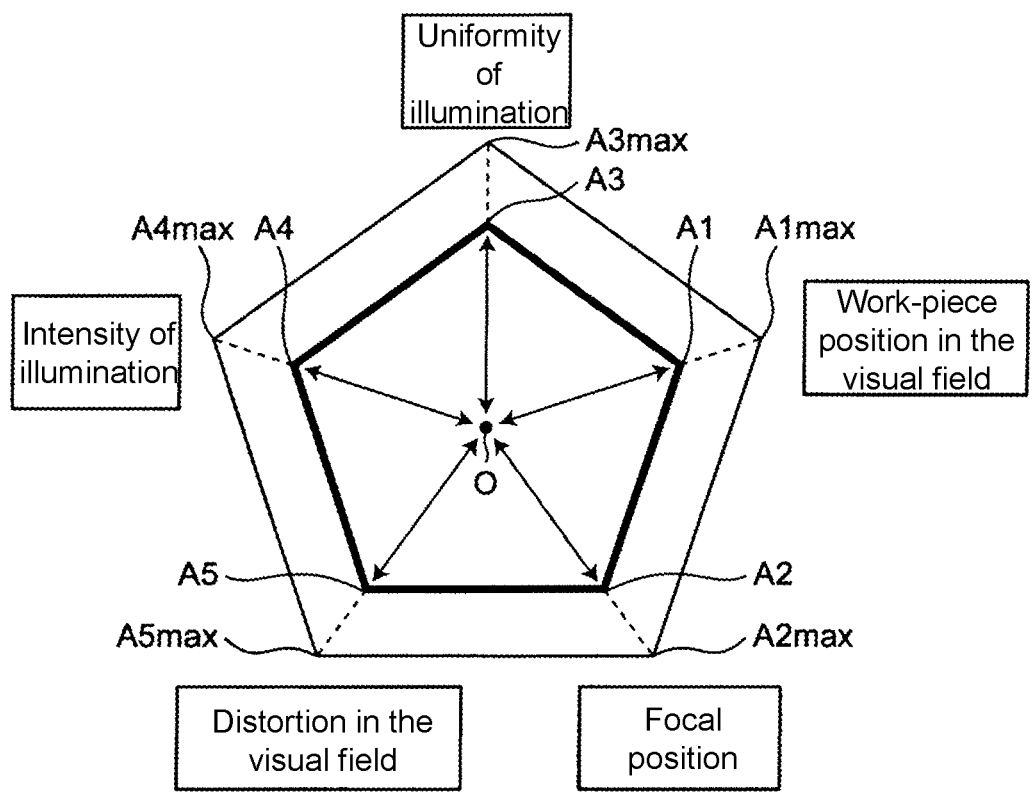
FIG. 4 is a drawing showing a relation between an individual evaluation value An related to an imaging parameter and a maximum individual evaluation value An max for an image obtained by imaging a certain work-piece.

Before an inspection using the appearance inspection device 1, the maximum value An max of the individual evaluation value of the imaging parameters is set in advance. The setting is a value predetermined by the user or a maximum value of the individual evaluation value calculated based on the master image. In the example, the type n of the imaging parameters is 5; as shown in FIG. 4, the imaging parameters of 5 types include "the work-piece position in the visual field", "the focal position", "the uniformity of illumination", "the intensity of illumination", and "the distortion in the visual field". In the example, the maximum value An max of the individual evaluation value of the imaging parameters is set as follows.

(1) As a maximum value A1 max of the individual evaluation value of "the work-piece position in the visual field", the maximum value of the individual evaluation value calculated based on the master image is set.

(2) As a maximum value A2 max of the individual evaluation value of "the focal position", the maximum value of the focal position, for example 105, which is predetermined by the user is set. Or the maximum value of the individual evaluation value calculated based on the master image is set.

(3) As a maximum value A3 max of the individual evaluation value of "the uniformity of illumination", the maximum value of the individual evaluation value calculated based on the master image is set.

(4) As a maximum value A4 max of the individual evaluation value of "the intensity of illumination", an intermediate value, for example 128, within the gradation of 0-255 which is predetermined by the user is set. Or the maximum value of the individual evaluation value calculated based on the master image is set.

(5) As a maximum value A5 max of the individual evaluation value of "the distortion in the visual field", the maximum value of the individual evaluation value calculated based on the master image is set.

FIG. 4 shows a relation between the individual evaluation value An related to the imaging parameter and the maximum value An max of the individual evaluation value for an image obtained by imaging a certain work-piece 50.

Lengths from the center O to the vertex of an external regular pentagon among a double pentagon in FIG. 4 respectively represent the maximum values (A1 max-A5 max) of the individual evaluation values. Lengths from the center O to the vertex of an internal regular pentagon among the double pentagon in the drawing respectively represent the individual evaluation values (A1-A5) related to the imaging parameters.

Figure 5:
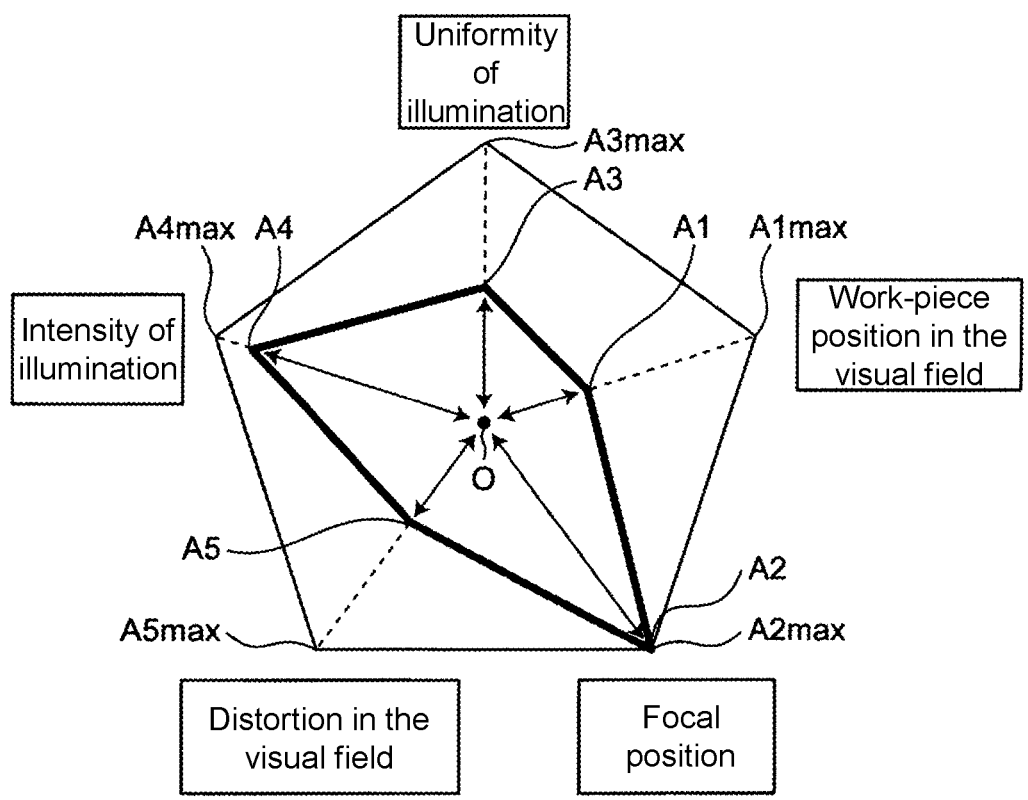
FIG. 5 is a drawing showing a relation between the individual evaluation value An related to the imaging parameter and the maximum individual evaluation value An max for another image obtained by changing the value of the imaging parameter to image the work-piece.

FIG. 5 shows a double pentagon similar to FIG. 4 for other images obtained by changing the values of the imaging parameters and imaging the work-piece 50. Lengths from the center O to the vertex of an external regular pentagon among a double pentagon in FIG. 5 respectively represent the maximum values (A1 max-A5 max) of the individual evaluation values. Lengths from the center O to the vertex of an internal pentagon among the double pentagon in the drawing respectively represent the individual evaluation values (A1-A5).

In the case of FIG. 5, the ratio A1/A1 max related to the work-piece position in the visual field is smaller compared with FIG. 4. That is, when the general evaluation value is calculated by the calculation formula Max{(1−An/An max)×100}, as a result, the general evaluation value is larger (worse). Accordingly, it is shown that the set of values of the imaging parameters of FIG. 5 is unsuitable as a set of values of the imaging parameters compared with the set of values of the imaging parameters of FIG. 4. In this example, the imaging parameters of FIG. 4 in which the general evaluation value is small is determined as the set of optimum values.

(Calculation Example 1 of General Evaluation Value)

Figure 6A:
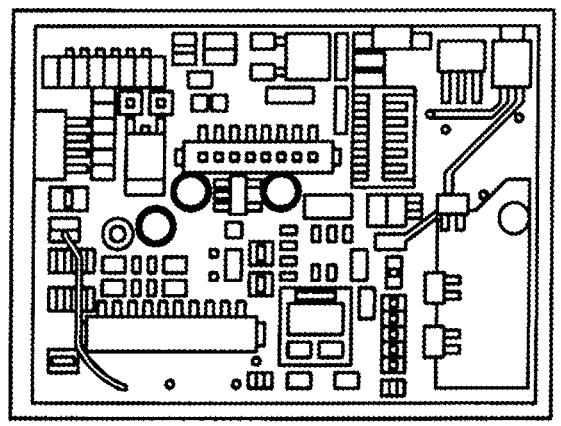
FIG. 6(A) is a drawing showing an example of a master image to be a model for a certain work-piece.
Figure 6B:
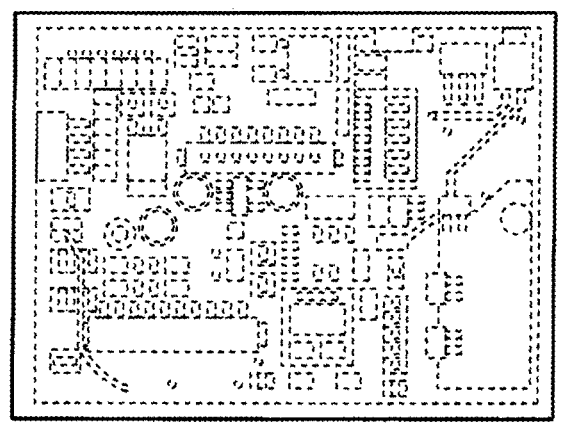
FIG. 6(B) is a drawing showing an image obtained by changing the value of the imaging parameter to image the work-piece.

FIG. 6(A) shows a master image registered in the storage 60 in the control device 40 in advance (an image to be a model for a certain work-piece 50), and FIG. 6(B) shows an image obtained by imaging the work-piece 50 by the appearance inspection device 1 of the example. The image of FIG. 6(B) corresponds to an image out of focus compared with the image of FIG. 6(A). In the example, the type n' of the imaging parameters is 5, and the imaging parameters of 5 types include "a focal position", "a color average of image", "a variation of the color average of image", "a distance from the center of visual field to the work-piece", and "a distortion in the visual field".

In the example, the individual evaluation value A1' related to "the focal position" is equal to 58, the individual evaluation value A2' related to "the color average of image" is equal to 100, the individual evaluation value A3' related to "the variation of the color average of image" is equal to 11, the individual evaluation value A4' related to "the distance from the center of visual field to the work-piece" is equal to 6, and the individual evaluation value A5' related to "the distortion in the visual field" is equal to 0.8.

In the example, the maximum value An' max of the individual evaluation value of the imaging parameters is set as follows. A1' max related to "the focal position" is equal to 105, A2' max related to "the color average of image" is equal to 128, A3' max related to "the variation of the color average of image" is equal to 10, A4' max related to "the distance from the center of visual field to the work-piece" is equal to 5, and A5' max related to "the distortion in the visual field" is equal to 1.0.

As a result, the individual evaluation value related to "the focal position" is the largest (worst), and thus the general evaluation value calculated by a calculation formula of the general evaluation value Max{(1−An'/An' max)×100} is 45.

Figure 7A:
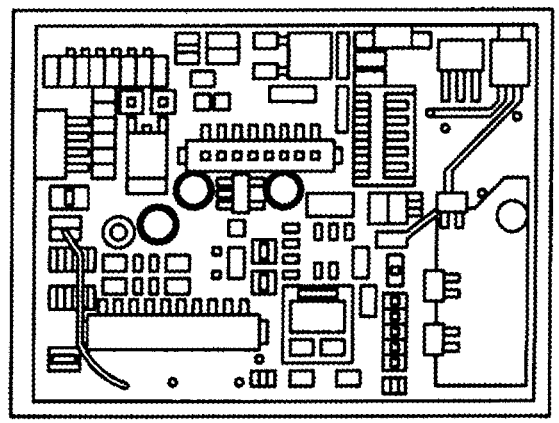
FIG. 7(A) is a drawing showing the same master image as in FIG. 6(A).
Figure 7B:
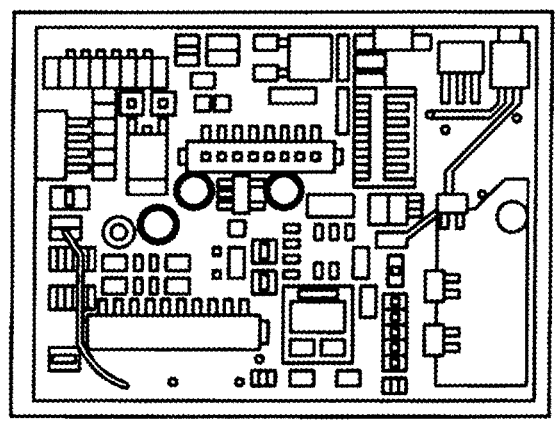
FIG. 7(B) is a drawing showing another image obtained by further changing the value of the imaging parameter to image the work-piece.

FIG. 7(A) shows a master image the same as the master image of FIG. 6(A), and FIG. 7(B) shows another image obtained by changing values of the imaging parameters and imaging the work-piece 50 by the appearance inspection device 1 of the example. The image of FIG. 7(B) corresponds to an image in focus (which is improved) compared with the image of FIG. 6(B). In the example, similar to the above example, the type n' of the imaging parameters is 5, and the imaging parameters of 5 types include "the focal position", "the color average of image", "the variation of the color average of image", "the distance from the center of visual field to the work-piece", and "the distortion in the visual field".

In the example, the individual evaluation value A1' related to "the focal position" is equal to 90, the individual evaluation value A2' related to "the color average of image" is equal to 120, the individual evaluation value A3' related to "the variation of the color average of image" is equal to 11, the individual evaluation value A4' related to "the distance from the center of visual field to the work-piece" is equal to 6, and the individual evaluation value A5' related to "the distortion in the visual field" is equal to 0.9.

Each of the set An max is the same as the An max used in the inspection of the work-piece 50 shown in FIG. 6(B).

As a result, the individual evaluation value related to "the focal position" becomes small (good), and the general evaluation value calculated by the calculation formula of the general evaluation value Max{(1−An'/An' max)×100} is 20.

According to the above results, the parameter determining part 80 compares the set of values of the imaging parameters given to the image of FIG. 6(B) and the set of values of the imaging parameters given to the image of FIG. 7(B), and determines the set of values of the imaging parameters giving the image of FIG. 7(B) in which the general evaluation value is smaller as the set of optimum values.

Figure 8A:
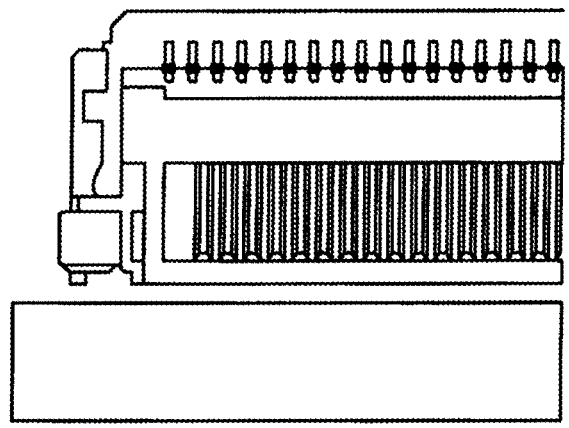
FIG. 8(A) is a drawing showing an example of a master image to be a model for a certain work-piece.
Figure 8B:
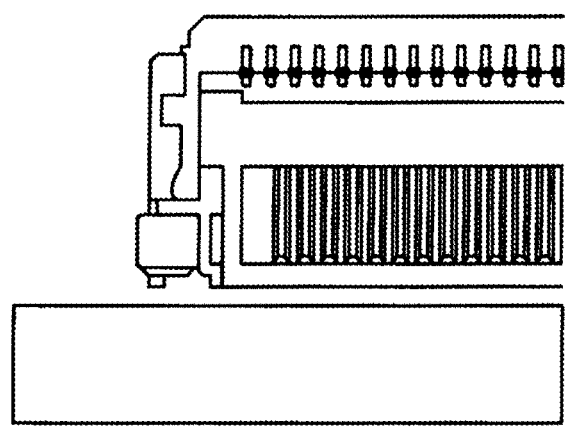
FIG. 8(B) is a drawing showing an image obtained by changing the value of the imaging parameter to image the work-piece.

(Calculation Example 2 of General Evaluation Value)
FIG. 8(A) shows a master image registered in the storage 60 in the control device 40 in advance (an image to be a model for a certain work-piece 50); FIG. 8(B) shows an image obtained by imaging the work-piece 50 by the appearance inspection device 1 of this example. The image of FIG. 8(B) corresponds to an image in which "the distance from the center of the visual field to the work-piece" is longer (worse) compared with the image of FIG. 8(A). In the example, the type n' of the imaging parameters is 5, and the imaging parameters of 5 types include "the focal position", "the color average of image", "the variation of the color average of image", "the distance from the center of visual field to the work-piece", and "the distortion in the visual field".

In the example, the individual evaluation value A1' related to "the focal position" is equal to 92, the individual evaluation value A2' related to "the color average of image" is equal to 188, the individual evaluation value A3' related to "the variation of the color average of image" is equal to 15, the individual evaluation value A4' related to "the distance from the center of visual field to the work-piece" is equal to 15, and the individual evaluation value A5' related to "the distortion in the visual field" is equal to 0.9.

In the example, the maximum value An' max of the individual evaluation value of the imaging parameters is set as follows. A1' max related to "the focal position" is equal to 102, A2' max related to "the color average of image" is equal to 192, A3' max related to "the variation of the color average of image" is equal to 10, A4' max related to "the distance from the center of visual field to the work-piece" is equal to 5, and A5' max related to "the distortion in the visual field" is equal to 1.0.

As a result, the individual evaluation value related to "the distance from the center of the visual field to the work-piece" is the largest (worst), and thus the general evaluation value, which is calculated by a calculation formula of the general evaluation value Max{(1−An'/An' max)×100} when the type n of the imaging parameters is 1-5, is 140.

Figure 9A:
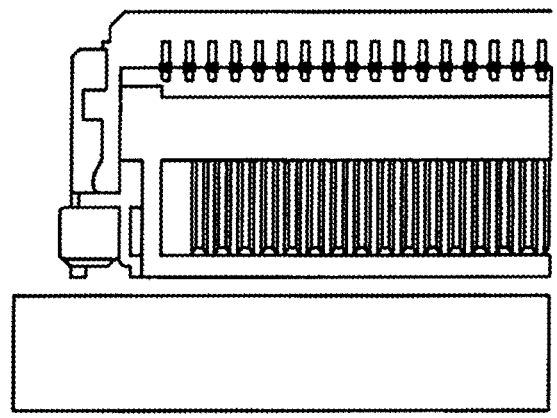
FIG. 9(A) is a drawing showing the same master image as in FIG. 8(A).
Figure 9B:
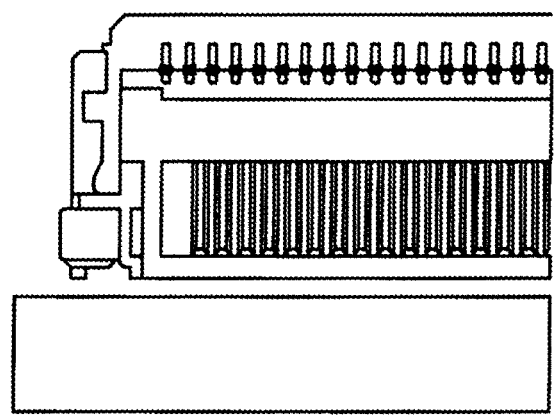
FIG. 9(B) is a drawing showing another image obtained by further changing the value of the imaging parameter to image the work-piece.

FIG. 9(A) shows a master image the same as the master image of FIG. 8(A), and FIG. 9(B) shows another image obtained by changing values of the imaging parameters and imaging the work-piece 50 by the appearance inspection device 1 of the example. The image of FIG. 9(B) corresponds to an image in which "the distance from the center of the visual field to the work-piece" is shorter (improved) compared with the image of FIG. 8(B). In the example, similar to the above example, the type n' of the imaging parameters is 5, and the imaging parameters of 5 types include "the focal position", "the color average of image", "the variation of the color average of image", "the distance from the center of visual field to the work-piece", and "the distortion in the visual field".

In the example, the individual evaluation value A1' related to "the focal position" is equal to 90, the individual evaluation value A2' related to "the color average of image" is equal to 64, the individual evaluation value A3' related to "the variation of the color average of image" is equal to 15, the individual evaluation value A4' related to "the distance from the center of visual field to the work-piece" is equal to 6, and the individual evaluation value A5' related to "the distortion in the visual field" is equal to 0.9.

Each of the set An' max is the same as the An' max used in the inspection of the work-piece 50 shown in FIG. 8(B).

As a result, the individual evaluation value related to "the distance from the center of the visual field to the work-piece" becomes small (good), and the general evaluation value, which is calculated by the calculation formula of the general evaluation value Max{(1−An'/An' max)×100} when the type n of the imaging parameters is 1-5, is 67.

According to the above results, the parameter determining part 80 compares the set of values of the imaging parameters given to the image of FIG. 8(B) and the set of values of the imaging parameters given to the image of FIG. 9(B), and determines the set of values of the imaging parameters given to the image of FIG. 9(B) in which the general evaluation value is smaller as the set of optimum values.

Besides, other examples of the imaging parameters are not limited hereto and there is a shutter speed which may be 1/200 seconds, 1/1000 seconds, 1/8000 seconds and the like. In addition, as for the light emission intensity of illumination, 255, 128, 64 and the like among the gradation of 0-255 are used. In addition, as for the light emission pattern of illumination, in light emitting surfaces of four divisions, a lighting of all the four surfaces, a lighting of only the left and right surfaces, a lighting of only the upper and lower surfaces or the like are used.

In the example, the general evaluation value is quantitatively defined. As a result, the imaging parameter can be precisely determined.

Figure 10:
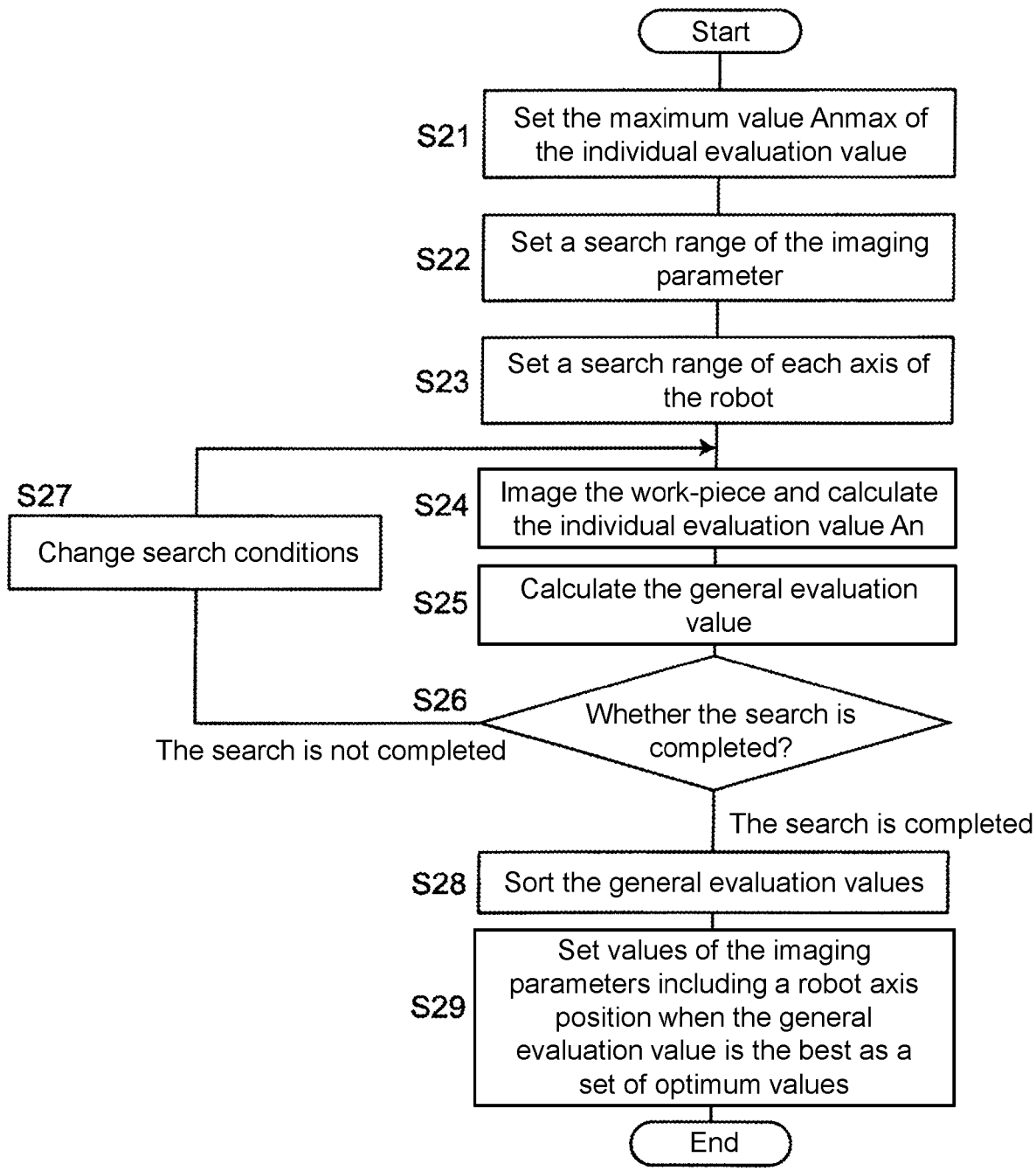
FIG. 10 is an operation flow chart when fully searching plural types of imaging parameters that are set.

(Search Example 1 of Imaging Parameter)
FIG. 10 is an operation flow when fully searching plural types of imaging parameters that are set.

The user sets the maximum value An max of the individual evaluation value (step S21). The user sets a search range of the imaging parameters (step S22). The user sets a search range of each axis of the robot (step S23). Step S21 to step S23 are preliminary settings before the search.

Next, the imaging processing part 70 and the parameter determining part 80 image the work-piece and calculate the individual evaluation value An (step S24). The parameter determining part 80 calculates the general evaluation values (step S25). The parameter determining part 80 judges whether the search is completed (step S26); when the search is not completed, the flow proceeds to step S27 and changes the search conditions, and then returns to step S24. When the search is completed, the search is ended and the flow proceeds to step S28.

Next, the parameter determining part 80 sorts a plurality of general evaluation values calculated in step S25 (step S28). Next, the parameter determining part 80 sets the values of the imaging parameters including a robot axis position when the general evaluation value is the best within the plurality of general evaluation values as the set of optimum values (step S29).

(Search Example 2 of Imaging Parameter)

In the above search example, the plural types of imaging parameters that are set are fully searched, but it is not limited hereto. It may be that a search for a subset (which is called a first imaging parameter) of one type or plural types of imaging parameters within the plural types of imaging parameters that are set is performed at first, and for the first imaging parameter, the value of the imaging parameter when the individual evaluation value is the best or the set of values of the imaging parameters when the general evaluation value is the best is obtained as a first optimum value or a first set of optimum values. After that, for a second imaging parameter different from the first imaging parameter (a set of the rest parameters except the first imaging parameter within the plural types of parameters), a value of the imaging parameter when the individual evaluation value is the best or a set of values of the imaging parameters when the general evaluation value is the best is obtained as a second optimum value or a second set of optimum values. Furthermore, in regard to a third imaging parameter different from the first imaging parameter and the second imaging parameter and a fourth imaging parameter (omitted below) different from the above imaging parameters, this partial search may be sequentially repeated.

Figure 11A:
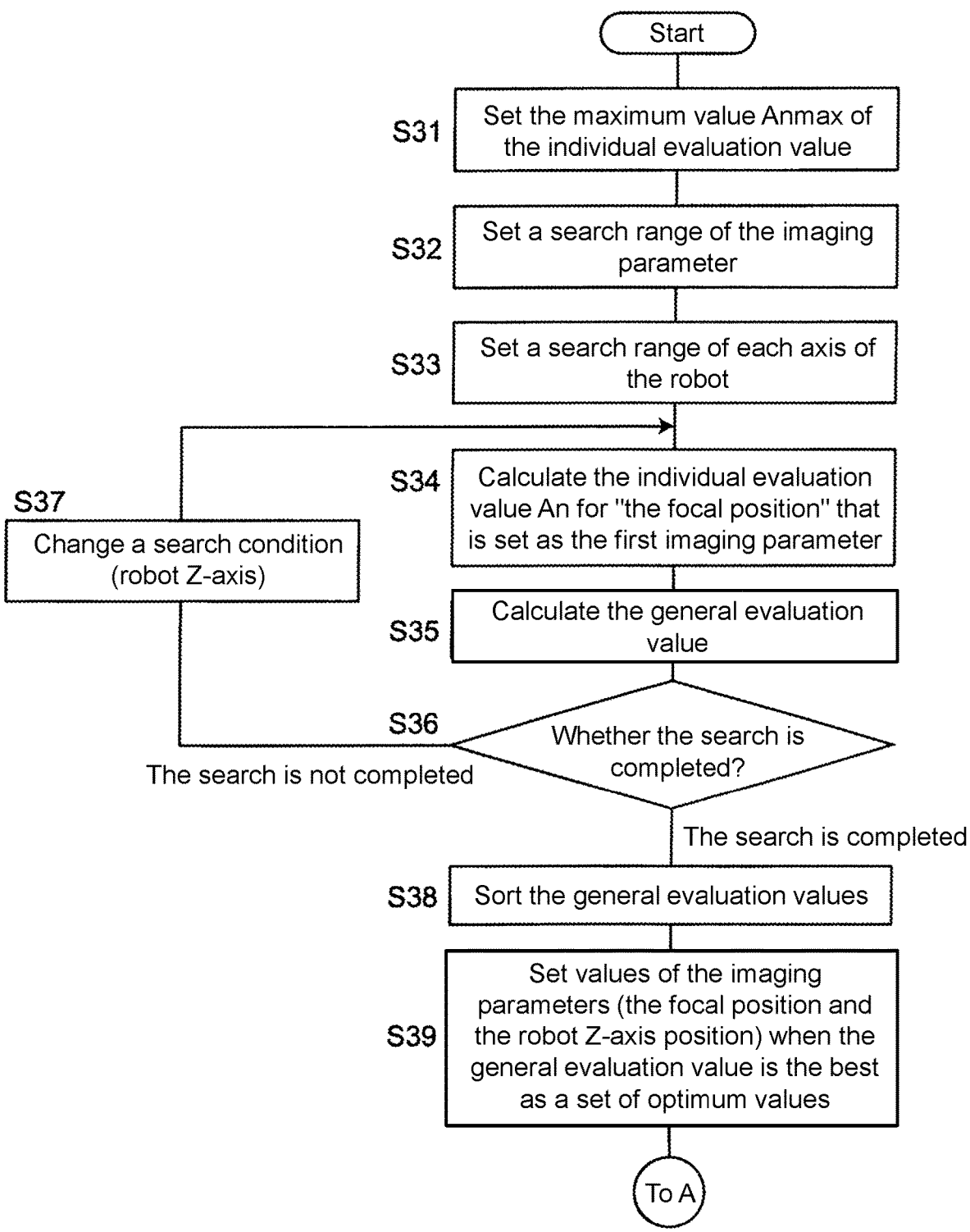
FIG. 11A is a drawing showing a preliminary part of an operation flow when repeating a partial search in the plural types of imaging parameters that are set.
Figure 11B:
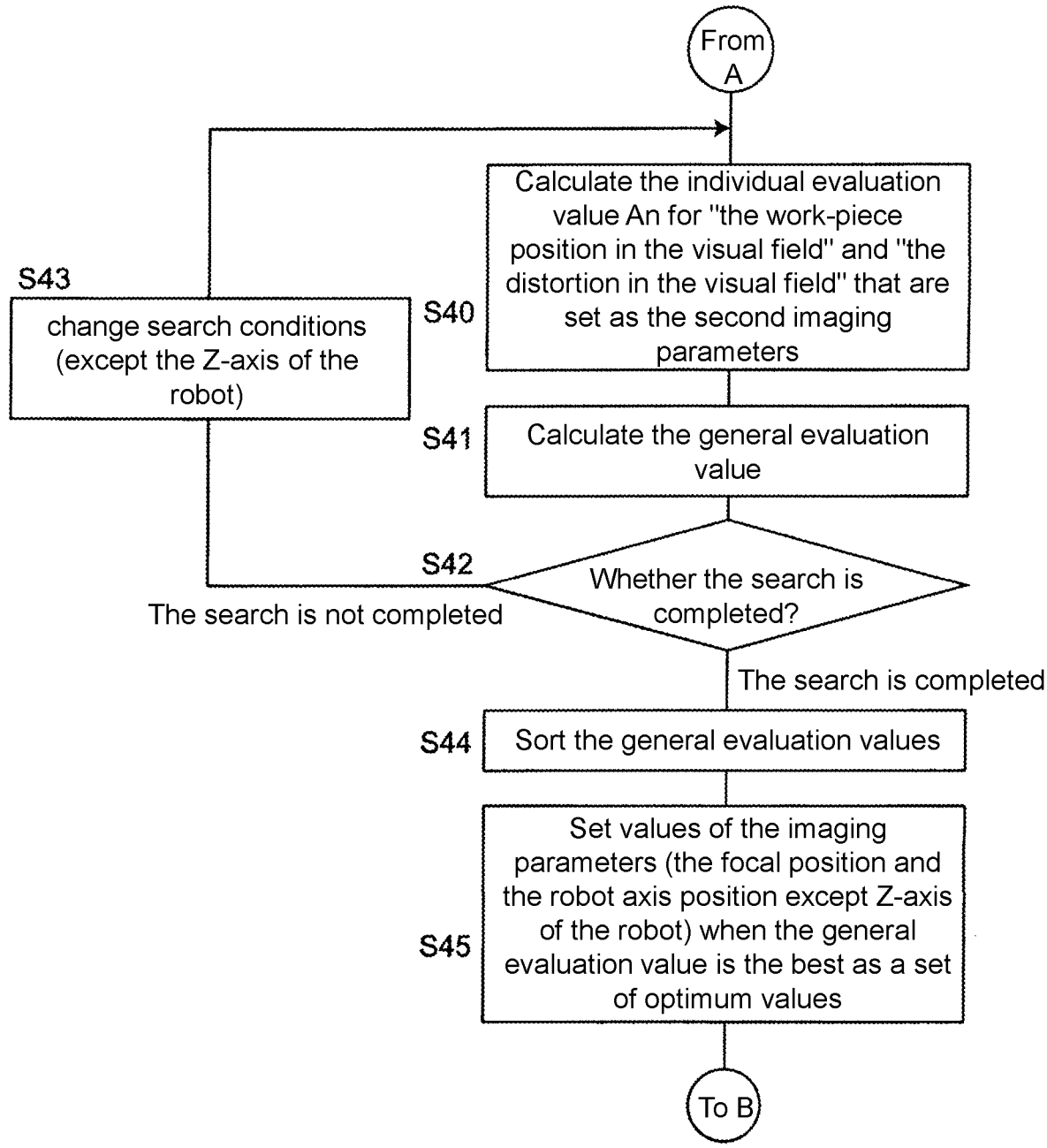
FIG. 11B is a drawing showing a middle part of the operation flow when repeating the partial search in the plural types of imaging parameters that are set.
Figure 11C:
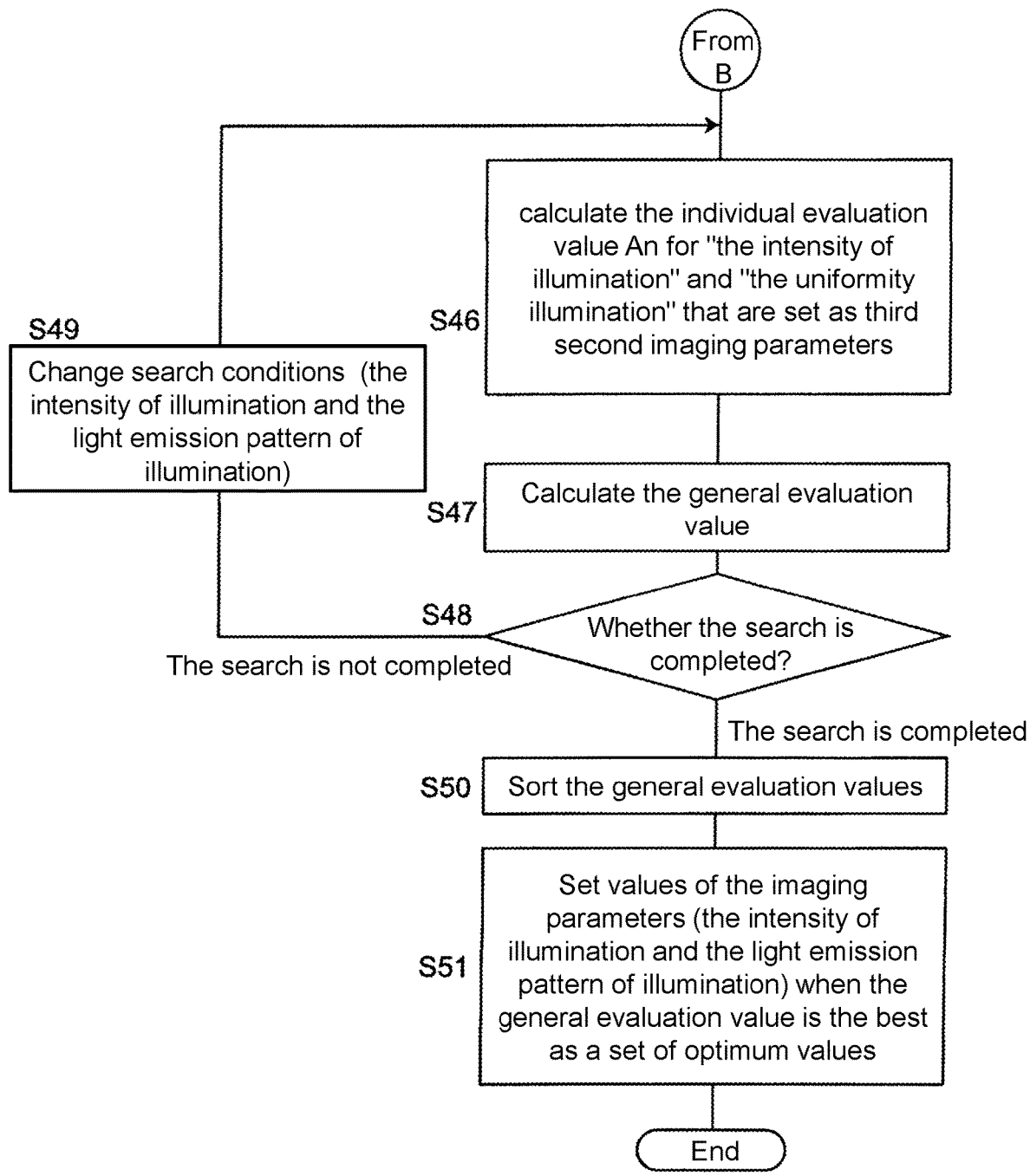
FIG. 11C is a drawing showing a latter part of the operation flow when repeating the partial search in the plural types of imaging parameters that are set.

FIG. 11A-FIG. 11C shows an operation flow when repeating the partial search in the plural types of imaging parameters that are set.

As shown in FIG. 11A, the user sets the maximum value An max of the individual evaluation value (step S31). The user sets the search range of the imaging parameters (step S32). The user sets the search range of each axis of the robot (step S33). Step S31 to step S33 are preliminary settings before the search.

Next, the imaging processing part 70 and the parameter determining part 80 image the work-piece and calculate the individual evaluation value An which is the individual evaluation value An for "the focal position" that is used as the first imaging parameter in this example (step S34). The parameter determining part 80 calculates the general evaluation value (step S35). The parameter determining part 80 judges whether the search is completed (step S36); when the search is not completed, the flow proceeds to step S37 and changes the search condition, which is the "robot Z-axis" in the example, and then returns to step S34. When the search is completed, the search is ended and the flow proceeds to step S38.

Next, the parameter determining part 80 sorts a plurality of general evaluation values calculated in step S35 (step S38). Next, the parameter determining part 80 sets the values of the imaging parameters (in the example, "the focal position" and "the robot Z-axis position") when the general evaluation value is the best within the plurality of general evaluation values as the set of optimum values (step S39). Next, the flow proceeds to step 40 of FIG. 11B.

As shown in FIG. 11B, the imaging processing part 70 and the parameter determining part 80 image the work-piece, and calculate the individual evaluation value An which is the individual evaluation value An for "the work-piece position in the visual field" and "the distortion in the visual field" that are set as the second imaging parameter in this example (step S40). The parameter determining part 80 calculates the general evaluation value (step S41). The parameter determining part 80 judges whether the search is completed (step S42); when the search is not completed, the flow proceeds to step S43 and changes the search condition, which is the value of "axis positions except Z-axis of the robot" in the example, and then returns to step S40. When the search is completed, the search is ended and proceeds to step S44.

Next, the parameter determining part 80 sorts the plurality of general evaluation values calculated in step S41 (step S44). Next, the parameter determining part 80 sets the values of the imaging parameters (in this example, "the work-piece position in the visual field", "the distortion in the visual field" and "the robot axis position except Z-axis of the robot") when the general evaluation value is the best within the plurality of general evaluation values as the set of optimum values (step S45). Next, the flow proceeds to step 46 of FIG. 11C.

As shown in FIG. 11C, the imaging processing part 70 and the parameter determining part 80 image the object and calculate the individual evaluation value An which is the individual evaluation value An for "the intensity of illumination" and "the uniformity of illumination" that are set as the third imaging parameter in this example (step S46). The parameter determining part 80 calculate the general evaluation value (step S47). The parameter determining part 80 judges whether the search is completed (step S48); when the search is not completed, the flow proceeds to step 49 and changes the search conditions, which are "the intensity of illumination" and "the light emission pattern of illumination" in the example, and then returns to step S46. When the search is completed, the search is ended and the flow proceeds to step S50.

Next, the parameter determining part 80 sorts the plurality of general evaluation values calculated in step S47 (step S50). Next, the parameter determining part 80 sets the values of the imaging parameters (in this example, "the light emission intensity of illumination" and "the light emission pattern of illumination") when the general evaluation value is the best within the plurality of general evaluation values as the set of optimum values and completes the search (step S51).

In the search operation of the example, firstly, the parameter determining part 80 obtains, for the predetermined first imaging parameter, the value of the imaging parameter when the individual evaluation value is the best or the set of values of the imaging parameters when the general evaluation value is the best as the first optimum value or the first set of optimum values. Accordingly, for example, for the imaging parameter emphasized in advance by the user (the first imaging parameter), a combination number between the imaging parameters is limited, and the set of optimum values (the first set of optimum values) is rapidly obtained. After that, the parameter determining part 80 obtains, for the second imaging parameter different from the first imaging parameter, the value of the imaging parameter when the individual evaluation value is the best or the set of values of the imaging parameters when the general evaluation value is the best as the second optimum value or the second set of optimum values. In this way, for the rest imaging parameter (the first imaging parameter), the combination number between the imaging parameters is limited, and the set of optimum values (the second set of optimum values) is rapidly obtained. This partial search may be further repeated. As a result, according to the appearance inspection device of the example, the optimum values of various imaging parameters are obtained rapidly.

In addition, the search operation is not limited to the above operation. For example, the partial search may be repeatedly performed while gradually narrowing down the search range.

The control device 40 can be configured by a processor which operates according to a program, a non-volatile semiconductor memory and the like. In other words, the control device 40 can be substantially configured by a computer device (for example, programmable logic controller (PLC) and the like). Accordingly, in an embodiment, the appearance inspection method described in FIG. 3 is configured as a program for the computer to execute. In addition, in an embodiment, the program is recorded in a computer-readable non-transitory recording medium. In this case, by making the computer device read and execute these programs recorded in the recording medium, the above-described appearance inspection method can be implemented.

The above embodiments are illustrative, and various modifications are possible without departing from the scope provided in the disclosure. Each of the above-described plurality of embodiments can be independently tenable, and the embodiments can be combined with each other. In addition, each of the various features in different embodiments can be independently tenable, and the features in different embodiments can also be combined with each other.

What is claimed is:

1. An appearance inspection device, which is an inspection device for inspecting an appearance of an object, comprising:
   an imaging part for taking an image of the object;
   an illumination part irradiating a light to the object;
   a moving means that changes relative positions of at least two or more portions within the object, the imaging part, and the illumination part;
   an imaging processing part that performs, in a state that the illumination part irradiates a light to the object, a processing for changing imaging parameters and taking a plurality of images by the imaging part while plural types of imaging parameters with mutually different properties are set variably, the plural types of imaging parameters including a change of the relative position between the object and the imaging part caused by the moving means; and
   a parameter determining part that determines a set of optimum values of the plural types of imaging parameters that are set variably based on the plurality of taken images, wherein the parameter determining part respectively calculates an individual evaluation value representing the quality degree for each of the imaging parameters for the plurality of images, calculates a general evaluation value by a predetermined calculation formula based on the individual evaluation value, and obtains a set of values of the imaging parameters when the general evaluation value is the best within the plurality of images as the set of optimum values.

2. The appearance inspection device according to claim 1, wherein
   the individual evaluation value is calculated based on a degree to which feature amounts extracted from the plurality of images are consistent with predetermined ideal values, or a degree to which the plurality of images are consistent with a pre-registered master image.

3. The appearance inspection device according to claim 1, wherein
   for a predetermined first imaging parameter, the parameter determining part calculates, under a condition that other parameters except the first imaging parameter are fixed, a value of the imaging parameter when the individual evaluation value is the best or a set of values of the imaging parameters when the general evaluation value is the best as a first optimum value or a first set of optimum values; after that, for a second imaging parameter different from the first imaging parameter, the parameter determining part calculates, under the condition that other parameters except the second imaging parameter are fixed, the value of the imaging parameter when the individual evaluation value is the best or the set of values of the imaging parameters when the general evaluation value is the best as a second optimum value or a second set of optimum values.

4. An appearance inspection method for inspecting an appearance of an object by an appearance inspection device, comprising:
   a step for performing, in a state that an illumination part irradiates a light to the object, a processing for changing imaging parameters and taking a plurality of images by an imaging part while plural types of imaging parameters with mutually different properties are set variably, the plural types of imaging parameters including a change of a relative position between the object and the imaging part caused by a moving means; and
   a step for determining a set of optimum values of the plural types of imaging parameters that are set variably based on the plurality of taken images, wherein an individual evaluation value representing the quality degree for each of the imaging parameters is calculated for the plurality of images, a general evaluation value is calculated by a predetermined calculation formula based on the individual evaluation value, and a set of values of the imaging parameters when the general evaluation value is the best within the plurality of images is obtained as the set of optimum values.

5. A non-transitory machine-readable storage medium storing a program for making a computer to:
   perform, in a state that an illumination part irradiates a light to an object, a processing for changing imaging parameters and taking a plurality of images by an imaging part while plural types of imaging parameters with mutually different properties are set variably, the plural types of imaging parameters including a change of a relative position between the object and the imaging part caused by a moving means, and determine a set of optimum values of the plural types of imaging parameters that are set variably based on the plurality of taken images, wherein an individual evaluation value representing the quality degree for each of the imaging parameters is calculated for the plurality of images, a general evaluation value is calculated by a predetermined calculation formula based on the individual evaluation value, and a set of values of the imaging parameters when the general evaluation value is the best within the plurality of images is obtained as the set of optimum values.

6. The appearance inspection device according to claim 2, wherein for a predetermined first imaging parameter, the parameter determining part calculates, under a condition that other parameters except the first imaging parameter are fixed, a value of the imaging parameter when the individual evaluation value is the best or a set of values of the imaging parameters when the general evaluation value is the best as a first optimum value or a first set of optimum values; after that, for a second imaging parameter different from the first imaging parameter, the parameter determining part calculates, under the condition that other parameters except the second imaging parameter are fixed, the value of the imaging parameter when the individual evaluation value is the best or the set of values of the imaging parameters when the general evaluation value is the best as a second optimum value or a second set of optimum values.

* * * * *